W. R. BARBOUR.
VEHICLE TIRE.
APPLICATION FILED AUG. 25, 1910.
1,001,237.
Patented Aug. 22, 1911.
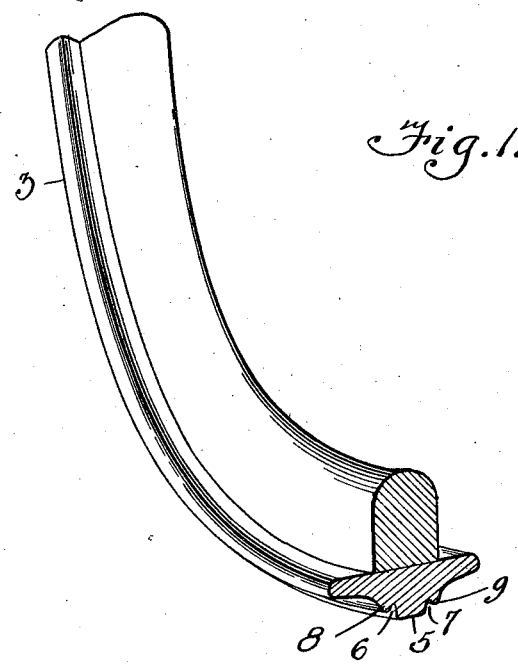
Fig. 1.
Fig. 2.
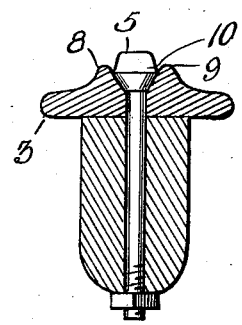
WITNESSES
INVENTOR
Wolsey R. Barbour

UNITED STATES PATENT OFFICE.

WOLSEY R. BARBOUR, OF TERRE HAUTE, INDIANA.

VEHICLE-TIRE.

1,001,237. Specification of Letters Patent. Patented Aug. 22, 1911.

Application filed August 25, 1910. Serial No. 578,922.

*To all whom it may concern:*

Be it known that I, WOLSEY R. BARBOUR, a citizen of the United States of America, and resident of Terre Haute, in the county of Vigo and State of Indiana, have invented certain new and useful Improvements in Vehicle-Tires, of which the following is a specification.

This invention relates to vehicle wheels and particularly to tires for such wheels.

An object of this invention is to produce a tire which will withstand boring and counter-sinking the holes for the tire bolts without materially weakening the said tire.

It has been found in practice that in tires having a thickened tread surface such as forms the subject matter of my patent on vehicle tires, the edge of the tire at the counter-sunk portion breaks and the tire begins to crack transversely, this being due to the fact that a very sharp edge is formed by counter-sinking the tire and the said sharp edges break away when the tire is in use.

It is an object of this invention to overcome the difficulties just mentioned and to further strengthen the tire having a thickened tread surface by producing novel ribs thereon, the tire between the ribs being bored and countersunk for the reception of the bolts and the heads thereof, the said ribs acting as guides in the operation of countersinking the tire for the reason that the operator may observe when the proper point is reached and the countersink has operated to a sufficient degree for the purpose of forming a seat for the heads of the bolts. By reason of the fact just mentioned, the heads of the bolts are placed at uniform depths whereas without the guiding ribs it has been found difficult to have the countersunk portions of the holes uniform.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a view in perspective of a fragment of a tire embodying the invention; and Fig. 2 illustrates a transverse sectional view thereof.

In these drawings 3 denotes a tire which is gradually increased in thickness toward the center on the outer surface thereof to form a thickened tread surface 5 and on each side of the tread surface of the tire channels 6 and 7 are formed which extend around the periphery of the tire and the said channels form ribs 8 and 9 on each side of the normal tread surface of the tire.

That portion of the tire between the ribs has holes 10 therein designed to receive the bolts, the said tire being also counter-sunk to permit the heads of the bolt to lie below the surface of the tire.

As has been heretofore stated, the fact that the ribs are formed on each side of the tread surface, the said ribs are not disturbed or impaired by boring the holes for the bolts and therefore the tire is not materially weakened by the presence of the bolt holes; then too, the countersunk portions of the tire do not extend into the ribs but terminate in the channeled portions of the tire. As the counter-sinking tool is in view of the operator, it follows that he may control the depth of the cut of said countersink with relation to the depth of the channels and thereby prevent undue cutting of the tire or the removal of an undue amount of material and this, in practice, has been found very advantageous and useful.

I claim—

A vehicle tire having a central tread surface increased in thickness with respect to the thickness of the edges of the tire, the said tire having peripheral channels, peripheral ribs on each side of the central tread surface, the tread portion of the tire having apertures for the reception of bolts and being counter-sunk beyond the depth of the channels.

In testimony whereof, I affix my signature in the presence of two witnesses.

WOLSEY R. BARBOUR.

Witnesses:
CLYDE E. HAWKINS,
CHAUNCY C. FOULKE.

Copies of this patent may be obtained for five cents each, by addressing the "Commissioner of Patents, Washington, D. C."